United States Patent
Jeon et al.

(10) Patent No.: US 12,476,830 B2
(45) Date of Patent: Nov. 18, 2025

(54) REAL-TIME IoT DATA SHARING SYSTEM SUPPORTING ATTRIBUTE-BASED ACCESS CONTROL AND METHOD THEREOF

(71) Applicants: DAEGU GYEONGBUK INSTITUTE OF SCIENCE AND TECHNOLOGY, Daegu (KR); RESEARCH & BUSINESS FOUNDATION SUNGKYUNKWAN UNIVERSITY, Suwon-si (KR)

(72) Inventors: Woo Jin Jeon, Daegu (KR); Dong Hyeon Yu, Daegu (KR); Hsu Ruei-Hau, Kaohsiung (TW); Je Min Lee, Suwon-si (KR); Ji Woong Choi, Seoul (KR)

(73) Assignees: DAEGU GYEONGBUK INSTITUTE OF SCIENCE AND TECHNOLOGY, Daegu (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/032,610

(22) PCT Filed: Sep. 16, 2022

(86) PCT No.: PCT/KR2022/013866
§ 371 (c)(1),
(2) Date: Apr. 19, 2023

(87) PCT Pub. No.: WO2023/120875
PCT Pub. Date: Jun. 29, 2023

(65) Prior Publication Data
US 2024/0380615 A1 Nov. 14, 2024

(30) Foreign Application Priority Data
Dec. 23, 2021 (KR) .................. 10-2021-0186293

(51) Int. Cl.
*H04L 29/06* (2006.01)
*H04L 9/06* (2006.01)
(Continued)

(52) U.S. Cl.
CPC .......... *H04L 9/3273* (2013.01); *H04L 9/0618* (2013.01); *H04L 9/0833* (2013.01); *H04L 9/3073* (2013.01)

(58) Field of Classification Search
CPC ... H04L 9/3273; H04L 9/0618; H04L 9/0833; H04L 9/3073
See application file for complete search history.

(56) References Cited

U.S. PATENT DOCUMENTS

2018/0375639 A1* 12/2018 Lauter .................. H04L 9/008
2023/0087557 A1* 3/2023 Dai .................. H04L 9/3073
713/160

FOREIGN PATENT DOCUMENTS

KR 10-1423956 8/2014
KR 10-2017-0119418 10/2017
(Continued)

Primary Examiner — Evans Desrosiers
(74) Attorney, Agent, or Firm — LEX IP MEISTER, PLLC (57) ABSTRACT

An IoT device according to an embodiment encrypts IoT data using a peripheral device and transmits the IoT data to a server, and a user device requests and obtains necessary IoT data from the server, thereby achieving real-time IoT data sharing. The IoT device performs only relatively low-performance operation of attribute-based encryption to encrypt IoT data collected through a sensor and outsources the remaining high-performance operations of attribute-based encryption to the peripheral device providing external communication network connection to the IoT device to generate a final ciphertext. A user device generates an attribute bloom filter using an access policy thereof, requests and obtains IoT data encrypted according to attribute-based (Continued)

encryption. A cloud server receives and stores IoT data encrypted by the IoT device and the peripheral device according to attribute-based encryption and transmits IoT data retrieved using the attribute bloom filter as a query to the user device.

15 Claims, 8 Drawing Sheets

(51) Int. Cl.
*H04L 9/08* (2006.01)
*H04L 9/30* (2006.01)
*H04L 9/32* (2006.01)

(56) References Cited

FOREIGN PATENT DOCUMENTS

| | | |
|---|---|---|
| KR | 10-2019-0035835 | 4/2019 |
| KR | 10-2020-0048760 | 5/2020 |
| KR | 10-2224264 | 3/2021 |
| KR | 10-2295660 | 8/2021 |

* cited by examiner

| Variables | Definition |
|---|---|
| TA | Trust authority |
| Br | Broker |
| $SA_I, D_i, C_n$ | $l^{th}$ security agent, $i^{th}$ IoT device, and $n^{th}$ consumer, respectively |
| $ID_x$ | Identity of entity $x$ |
| $PID_{D_i}, TID_{D_i}$ | Pseudo and temporary identity of $D_i$, respectively |
| $K_{IB}$ | Pre-shared key between all IoT devices and $Br$ |
| $K_{SA_l-Br}$ | Pre-shared key between $SA_l$ and $Br$ |
| $K_{SA_l-TA}$ | Pre-shared key between $SA_l$ and $TA$ |
| $K_{D_i-TA}$ | Pre-shared key between $D_i$ and $TA$ |
| $K_{C_n-Br}$ | Pre-shared key between $C_n$ and $Br$ |
| $E_k$ | Symmetric encryption with key $k$ |
| $D_k$ | Symmetric decryption with key $k$ |
| $T_{pk}$ | Private key of $TA$ |
| $B_{ABF}$ | The number of blocks in $ABF$ |
| $\lambda$ | The bit length of a block in $ABF$ |
| $L_{rn}$ | Maximum bit length of the row numbers of matrix A |
| $L_{attn}$ | Maximum bit length of attribute names |
| $L_{attv}$ | Maximum bit length of attribute values |

REAL-TIME IoT DATA SHARING SYSTEM SUPPORTING ATTRIBUTE-BASED ACCESS CONTROL AND METHOD THEREOF

BACKGROUND OF THE INVENTION

Field of the Invention

The present invention relates to a system for sharing real-time IoT data, and more specifically, to a real-time IoT data sharing system that supports attribute-based access control.

Description of the Related Art

Data collected in real time from Internet of Things (IoT) devices can be transmitted to other electronic devices through the Internet and used in various ways. For example, when IoT data is encrypted and transmitted to a cloud server in order to allow an owner who has collected the IoT data and a user who needs the IoT data to share the IoT data, the cloud server can request that the owner generate a re-encryption key at the request of the user, convert the encrypted IoT data such that only the user can decrypt the same using the re-encryption key, and transmit the converted IoT data to the user. However, if the number of users requiring IoT data increases, it is difficult to share IoT data in real time due to the problem of performing complex encryption operations corresponding to the number of users because IoT devices have low computational performance.

SUMMARY OF THE INVENTION

According to embodiments, an IoT device that outsources some high-performance operations of an attribute-based encryption technique to a peripheral device in order to share IoT data in real time can be provided.

According to embodiments, a server that stores encrypted IoT data, retrieves IoT data using an attribute bloom filter as a query, and provides the IoT data to a legitimate consumer can be provided.

According to embodiments, a user device that generates an attribute bloom filter using attributes of an access policy thereof, transmits the attribute bloom filter to a server to request IoT data, and obtains IoT data retrieved using an attribute bloom filter as a query can be provided.

In accordance with an aspect of the present invention, the above and other objects can be accomplished by the provision of an IoT device including at least one sensor, which is configured to collect IoT data at regular intervals through the at least one sensor, to generate a partially encrypted intermediate ciphertext by performing at least some operations of attribute-based encryption on the IoT data, and to transmit the intermediate ciphertext to a peripheral device in order to request remaining operations of attribute-based encryption for the intermediate ciphertext.

In accordance with another aspect of the present invention, there is provided an electronic device including a communication interface, which is configured to provide external network communication connection to an IoT device using the communication interface, to receive data and an encryption request for the data from the IoT device, to generate a ciphertext by performing some operations of attribute-based encryption on the data in response to the encryption request, and to transmit the ciphertext to a server.

In accordance with a further aspect of the present invention, there is provided an electronic device configured to encrypt attributes constituting an access policy with a group key and create an attribute bloom filter using the encrypted access policy, to transmit the attribute bloom filter to a server to request IoT data, to receive a ciphertext searched by using the attribute bloom filter as a query and an attribute set for the ciphertext from the server, and to obtain IoT data by decrypting the ciphertext using the group key and a private key.

Other aspects, features, and advantages other than those described above will become apparent from the following drawings, claims, and detailed description of the invention.

According to embodiments, it is possible to safely transmit data to multiple receivers through one-time encryption using an attribute-based encryption technique in a system sharing IoT data.

According to embodiments, it is possible to share IoT data with consumers (receivers) through a server in real time by performing an attribute-based encryption operation that requires relatively low performance by an IoT device and performing attribute-based encryption operation that requires relatively high performance by a peripheral device in a system sharing IoT data.

According to embodiments, when a consumer encrypts the attribute of his/her access policy with a group key shared with a device that generates IoT data and requests encrypted IoT data from a server using an attribute bloom filter generated using the access policy, the server transmits a ciphertext retrieved using an attribute bloom filter as a query to the consumer, to thereby provide IoT data only to the legitimate consumer without leaking information on the ciphertext.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments will be described in detail with reference to the accompanying drawings. However, the scope of rights is not restricted or limited by these embodiments. Like reference numerals in each figure indicate like elements.

The terms used in the description below have been selected as general and universal ones in the related technical field, but there may be other terms depending on the development and/or change of technology, the preference of those skilled in the art, etc. Therefore, the terms used in the following description should not be understood as limiting technical ideas, but should be understood as exemplary terms for describing embodiments.

In addition, in a specific case, there are also terms arbitrarily selected by the applicant, and in this case, the detailed meaning will be described in the corresponding description section. Therefore, the terms used in the following description should be understood based on the meanings of the terms and the contents throughout the specification, not simply the names of the terms.

Figure 1:
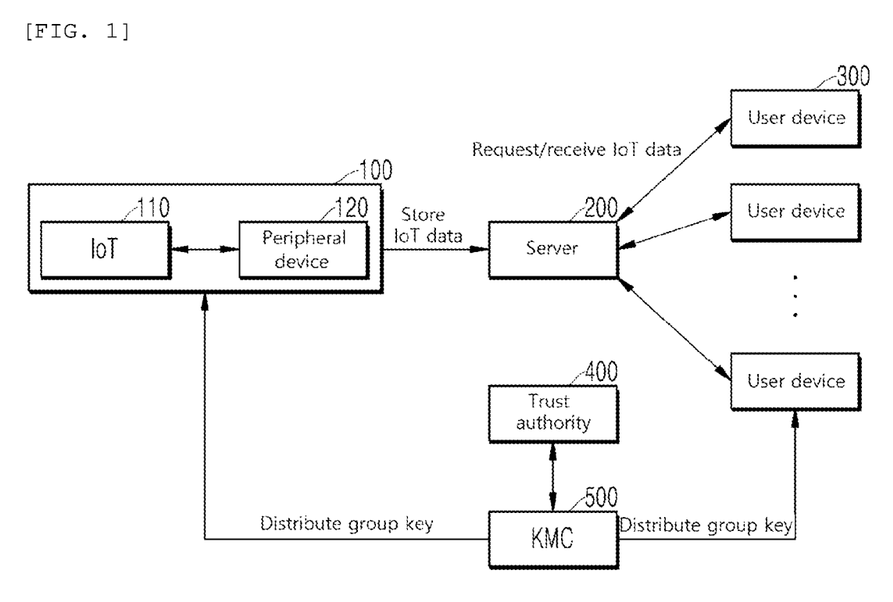
FIG. 1 illustrates a network environment including a system for sharing IoT data according to an embodiment.

FIG. 1 illustrates a network environment including a system 100 for sharing IoT data according to an embodiment. The system 100 for sharing IoT data may include an IoT device 110 and a peripheral device 120 located around the IoT device 110. In one embodiment, the system 100 for sharing IoT data may encrypt data collected from the IoT device 110 according to attribute-based encryption (ABE) and transmit the data to a server 200. Attribute-based encryption is a public key encryption method and can encrypt data using an attribute. Decryption can be performed when attributes assigned to a ciphertext match attributes of a private key. Attribute-based encryption enables fine-grained access control because only specific receivers can access data through attribute assignment. Attribute-based encryption (ABE) includes ciphertext-policy (CP)-ABE and key-policy (KP)-ABE. The CP-ABE is a method in which an access policy composed of attributes is assigned to a ciphertext and an attribute set is assigned to a decryption key. On the other hand, KP-ABE is a method in which an attribute set is assigned to a ciphertext and an access policy is assigned to a decryption key. In one embodiment, the system 100 for sharing IoT data and a user device 300 may perform data encryption/decryption using KP-ABE in which an attribute set is assigned to a ciphertext. Since a ciphertext according to KP-ABE includes an attribute set used to encrypt data, and attributes represent information on the data of the ciphertext, information on the original data may be leaked. In one embodiment, the system 100 for sharing IoT data prevents data leakage by symmetrically encrypting attributes included in a ciphertext using a group key. The IoT device 110 may encrypt attributes of IoT data using the group key, and the user device 300 may encrypt attributes constituting an access policy thereof with the group key. The IoT device 110 may transmit the encrypted IoT data and the encrypted attribute set to the server 200 through the peripheral device 120, and the user device 300 may generate an attribute bloom filter using the encrypted access policy and transmit the attribute bloom filter to the server 200 to request IoT data. The server 200 may retrieve attribute sets of a plurality of pieces of stored IoT data by using the attribute bloom filter as a query and transmit encrypted IoT data corresponding to the matched attribute set to the matched user device 300. Since the server 200 cannot ascertain the group key shared by the IoT device 110 and the user device 300, the server 200 can act as a broker for data sharing without leakage of IoT data.

The IoT device 110 may detect data (e.g., human heartbeat) therearound through a sensor (e.g., an electrocardiogram sensor) at the end of the system 100 for sharing IoT data and share the detected data with another electronic device (e.g., a user device 300). In one embodiment, the IoT device 110 may encrypt IoT data together with the peripheral device 120. For example, the IoT device 110 with low computational performance may outsource some operations of an encryption process according to attribute-based encryption to the peripheral device 120 with relatively high computational performance. The peripheral device 120 may be located around the IoT device 110 and serve as a path connecting the IoT device 110 to the external Internet. In one embodiment, the peripheral device 120 may provide resources necessary for the IoT device 110 to encrypt data. In terms of providing resources for encryption operation, the peripheral device 120 may be regarded as a security agent (SA). In various embodiments, the peripheral device 120 has better performance than the IoT device 110 and may be, for example, a router, a base station, or a roadside device. Attribute-based encryption includes a multiplication operation, an exponential operation, and a bilinear pairing operation, and the exponential operation and the bilinear pairing operation require a large amount of computation. Since the IoT device 110 has low power and low computational performance, it takes a long time to execute operations and it is difficult to process data in real time and transmit the same to the server 200 if all operations of attribute-based encryption are performed. In one embodiment, the IoT device 110 may perform only some operations of attribute-based encryption based on edge-computing and outsource a process including an exponential operation and a bilinear pairing operation requiring a relatively large amount of computation to the peripheral device 120.

The user device 300 may serve as a consumer that requests and obtains necessary IoT data from the server 200 to utilize the IoT data. The user device 300 may obtain/decrypt only desired data by receiving a private key from a trust authority (TA) 400 according to definition of an access policy. In one embodiment, the user device 300 may use an attribute bloom filter as a query in order to check whether an attribute set encrypted in a ciphertext in which IoT data has been encrypted according to attribute-based encryption and the private key of the data receiver (user device 300) match each other. A bloom filter is a probabilistic data structure used to test whether a set includes an element. The bloom filter includes several blocks, each block being composed of one bit and represented by a value of 0 or 1, to test whether an element is present in a set. In the Garbled bloom filter, one block is composed of several bits, and data stored in the bloom filter can be recovered. An access policy or an attribute set is included in a ciphertext according to attribute-based encryption, and a bloom filter for the access policy or attribute set may be generated. The IoT device 110 according to an embodiment may encrypt an attribute set for attributes of IoT data using a group key and transmit the encrypted attribute set to the server 200 through the peripheral device 120, and the user device 300 according to an embodiment may encrypt the access policy included in the private key generated according to KP-ABE with the group key, generate an attribute bloom filter, and transmit the attribute bloom filter to the server 200. The server 200 may query the encrypted attribute set generated by the IoT device 110 and the attribute bloom filter generated by the user device 300, and if they match, ascertain that the attribute set of the ciphertext and the access policy of the private key match each other. The receiver who succeeds in matching can decrypt the ciphertext using the private key. Since the process of generating and querying the attribute bloom filter includes only hash function operation, it requires a small amount of computation and enables rapid computation.

The server 200 may store encrypted IoT data using, for example, a cloud server. The server 200 may serve as a broker for retrieving stored IoT data for IoT data desired by a user and transmitting the IoT data in response to a user request. The server 200 may query attribute bloom filters created and transmitted by a plurality of user devices for necessary data thereof with respect to data attributes of a ciphertext, and transmit matching IoT data to each user device. Since only the system 100 for sharing IoT data and the user device 300 have a group key for IoT data, the server 200 only knows some information (attribute bloom filter) on the ciphertext and cannot decrypt the ciphertext, and thus security can be maintained.

The trust authority (TA) 400 may provide system initialization and authorization for entities. The TA 400 may provide device authentication for the IoT device 110 during an initial construction process. The TA 400 may generate parameters for the system through a setting process and distribute encryption keys suitable for respective entities (e.g., the IoT device 110 and the user device 300).

A key management center (KMC) 500 may periodically update and manage a group key G shared by the IoT device 110 and the user device 300.

Figure 2:
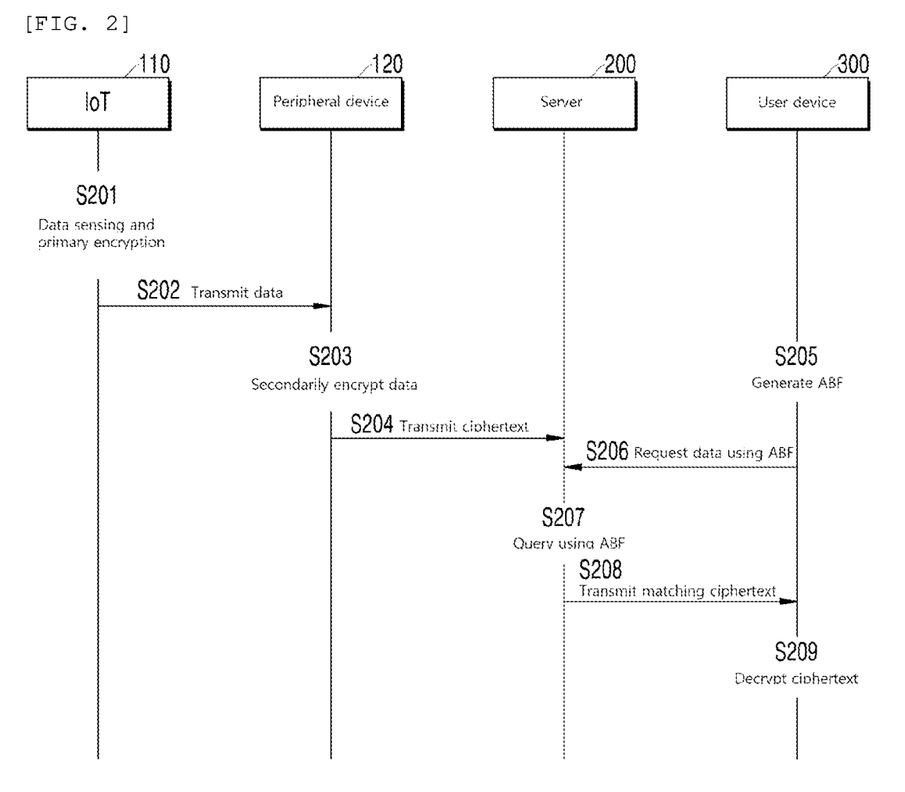
FIG. 2 is a sequence diagram showing a procedure in which the system for sharing IoT data according to an embodiment shares IoT data with a user device.

FIG. 2 is a sequence diagram showing a procedure in which the system for sharing IoT data according to an embodiment shares IoT data with a user device. The system 100 for sharing IoT data may encrypt some of IoT data collected by the IoT device 110, generate a final ciphertext in the peripheral device 120, and share the final ciphertext with the user device 300 through the server 200.

In step S201, the IoT device 110 may collect data at regular intervals using a sensor. In various embodiments, the IoT device 110 may include various sensors, and the IoT device 110 may operate in a fixed position or may be movable. The IoT device 110 may perform primary encryption on the collected sensor data according to attribute-based encryption. For example, the IoT device 110 may perform some operations including only relatively simple operations in attribute-based encryption. The IoT device 110 may generate an attribute set obtained by symmetrically encrypting attributes of IoT data using a group key.

In step S202, the IoT device 110 may transmit the primarily encrypted data to the peripheral device 120. The IoT device 110 may transmit the encrypted attribute set to the peripheral device 120 along with the encrypted data.

In step S203, the peripheral device 120 may receive the data primarily encrypted according to attribute-based encryption and perform secondary encryption according to attribute-based encryption to generate a final ciphertext. The peripheral device 120 may perform a communication function for connecting to the external Internet, and may perform relatively high-performance computation compared to the IoT device 110. The peripheral device 120 may be, for example, a router, and may perform remaining operations of attribute-based encryption on the received data.

In step S204, the peripheral device 120 may transmit the final ciphertext and the attribute set for the ciphertext to the server 200.

In order to request desired IoT data, the user device 300 may encrypt attributes constituting an access policy included in a private key thereof using the group key and generate an attribute bloom filter (ABF) for the encrypted access policy in step S205, and request the desired IoT data by transmitting the attribute volume filter (ABF) to the server 200 in step S206.

In step S207, the server 200 may retrieve stored encrypted IoT data for an attribute set of matched IoT data using the attribute bloom filter (ABF) as a query. Since the encrypted attribute set and the attribute bloom filter using the encrypted access policy are compared, the server 200 can serve as a broker without the need to ascertain (decrypt) the encrypted IoT data.

In step S208, the server 200 may transmit a matched IoT data ciphertext to the user device 300 that has requested the IoT data.

In step S209, the user device 300 may decrypt the received ciphertext using the private key according to attribute-based encryption.

Figure 3:
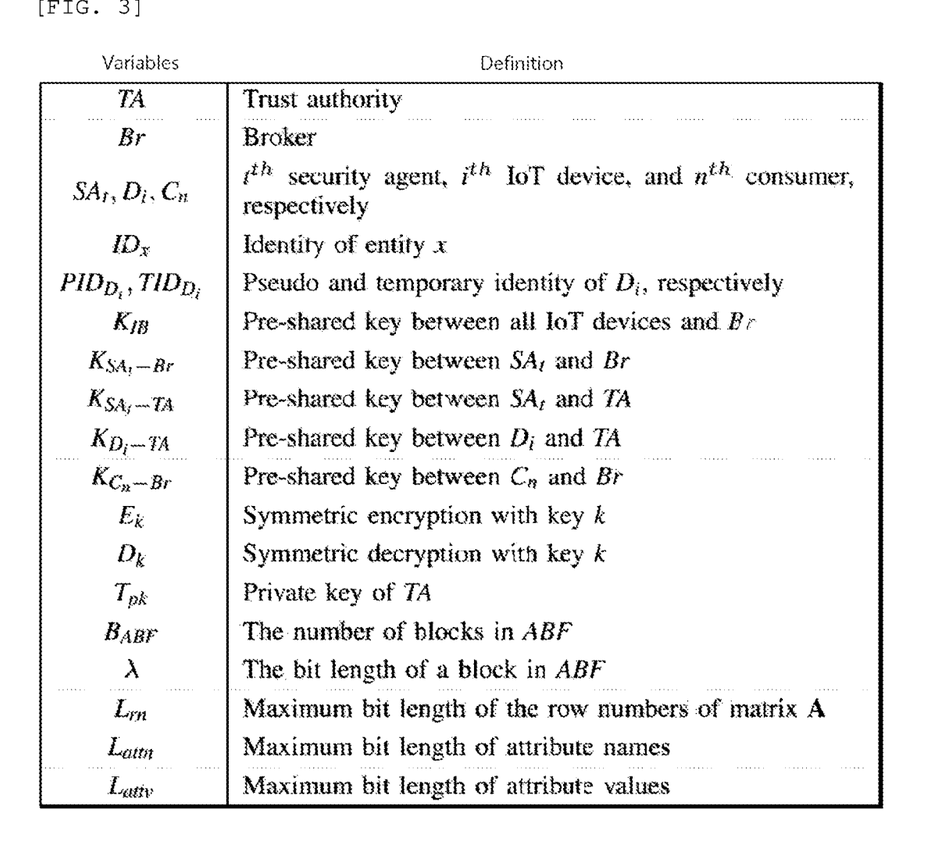
FIG. 3 is a table showing definitions of variables used in a method of sharing IoT data according to an embodiment.

FIG. 3 is a table showing variables used when IoT data is encrypted according to attribute-based encryption according to an embodiment and definitions thereof. In the present disclosure, variables and descriptions (definitions) of the variables are first described in the table of FIG. 3 in order to describe embodiments. Variables mentioned in the present disclosure can be interpreted in detail through the description of FIG. 3.

Figure 4:
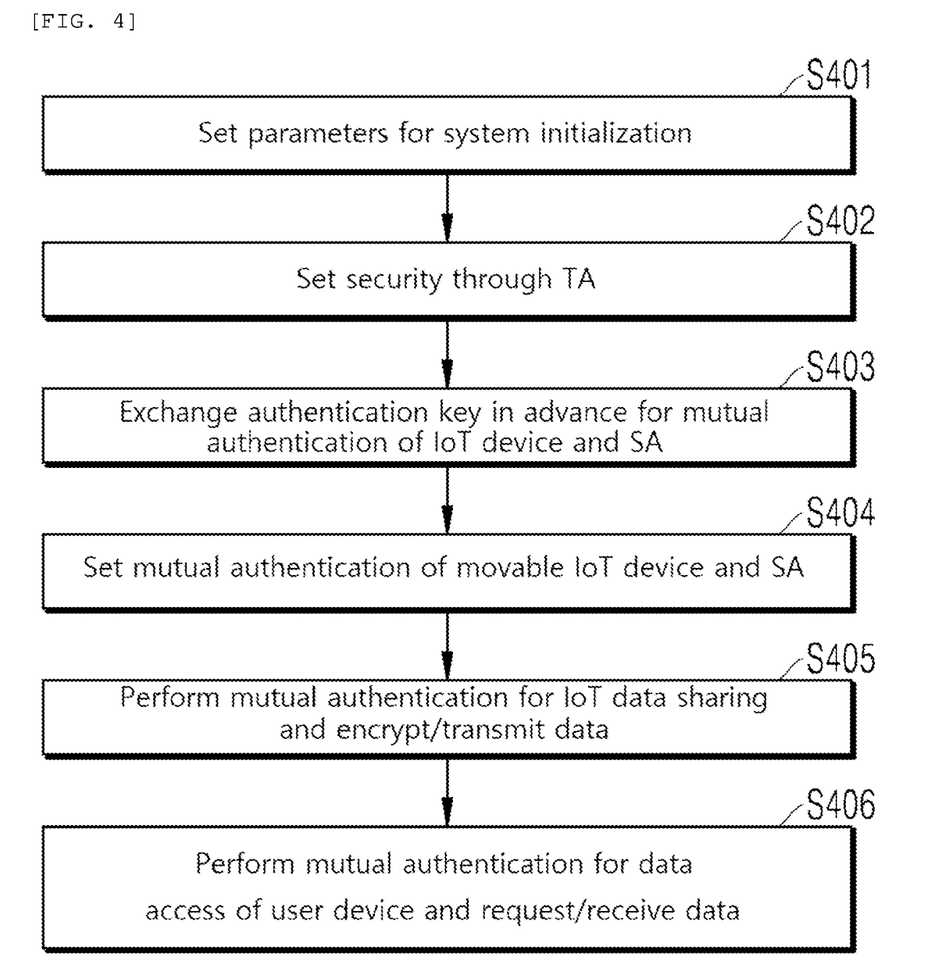
FIG. 4 is a flowchart of a protocol for sharing IoT data in the system for sharing IoT data according to an embodiment.

FIG. 4 is a flowchart of a protocol for sharing IoT data in the system for sharing IoT data according to an embodiment.

In step S401, the TA 400 may initialize the system by setting parameter values for performing the protocol.

In step S402, each entity may set security through the TA 400. Each entity (e.g., the IoT device 110, peripheral device (SA) 120, server 200, and user device 300) may transmit an ID to the TA for the entire system for sharing IoT data, and register with the TA to receive parameters necessary in a process of sharing IoT data.

In step S403, the IoT device 110 and the peripheral device (SA) 120 may exchange keys for authentication before transmitting IoT data. For example, the IoT device 110 may exchange key values necessary for mutual authentication in order to outsource a part of data encryption to the peripheral device 120 in advance.

In step S404, mutual authentication with the peripheral device (SA) 120 for the movable IoT device 110 may be established. As the mobile IoT device 110 such as a vehicle or a smartphone moves, the peripheral device (SA) 120 for Internet connection may be continuously changed. The IoT device 110 needs to rapidly authenticate with the peripheral device 120 to enable real-time data sharing. A handover process at the time of moving from a previous peripheral device 120 to the next peripheral device 120 may be set in advance. In various embodiments, various methods that can be used for handover between the mobile IoT device 110 and the peripheral device (SA) 120 for communication establishment may be applied. For example, the IoT device 110 may use a secure domain-based handover ReHand for rapid mutual authentication with respect to the peripheral device 120.

In step S405, mutual authentication is performed between the IoT device 110 and the peripheral device 120 to share IoT data, and the IoT device 110 and the peripheral device 120 encrypt the IoT data together and transmit the encrypted IoT data to the server 200. The IoT device 110 collects data through a sensor, and the IoT device 110, the peripheral device (SA) 120, and the server 200 perform mutual authentication using keys exchanged in system initialization settings. The IoT device 110 may randomly select a symmetric key $k_s$ and symmetrically encrypts the IoT data to create ED=$E_{k_s}$(Data). The IoT device 110 may generate an intermediate ciphertext MC'={AC', $AC_0$, S*, H, r} by encrypting the symmetric key $k_s$ with an algorithm Enc1IoT. The algorithm Enc1IoT includes some operations of attribute-based encryption, and may include multiplication and subtraction operations requiring a relatively small amount of computation. The algorithm Enc1IoT can partially encrypt data M for an attribute set S using a previously calculated MC. The IoT device 110 may symmetrically encrypt the attribute set S of IoT data using a key $K_{Group}$ received from the KMC 500 to generate $S_{enc}$. The IoT device 110 may transmit ED obtained by symmetrically encrypting the IoT data, the intermediate ciphertext MC', and the encrypted attribute set $S_{enc}$ to the peripheral device (SA) 120. The peripheral device (SA) 120 may generate a final ciphertext CT={C, $C_0$, $C_1$} by performing the remaining operations of attribute-based encryption using an algorithm Enc2SA on the intermediate ciphertext MC'. The peripheral device (SA) 120 may transmit the symmetric ciphertext ED, the final ciphertext CT, and the encrypted attribute set $S_{enc}$ to the server 200. The server 200 may store the symmetric ciphertext ED, the final ciphertext CT, and the encrypted attribute set $S_{enc}$ received from the peripheral device (SA) 120 in the cloud server. This step will be described in detail in FIG. 5.

Figure 6:
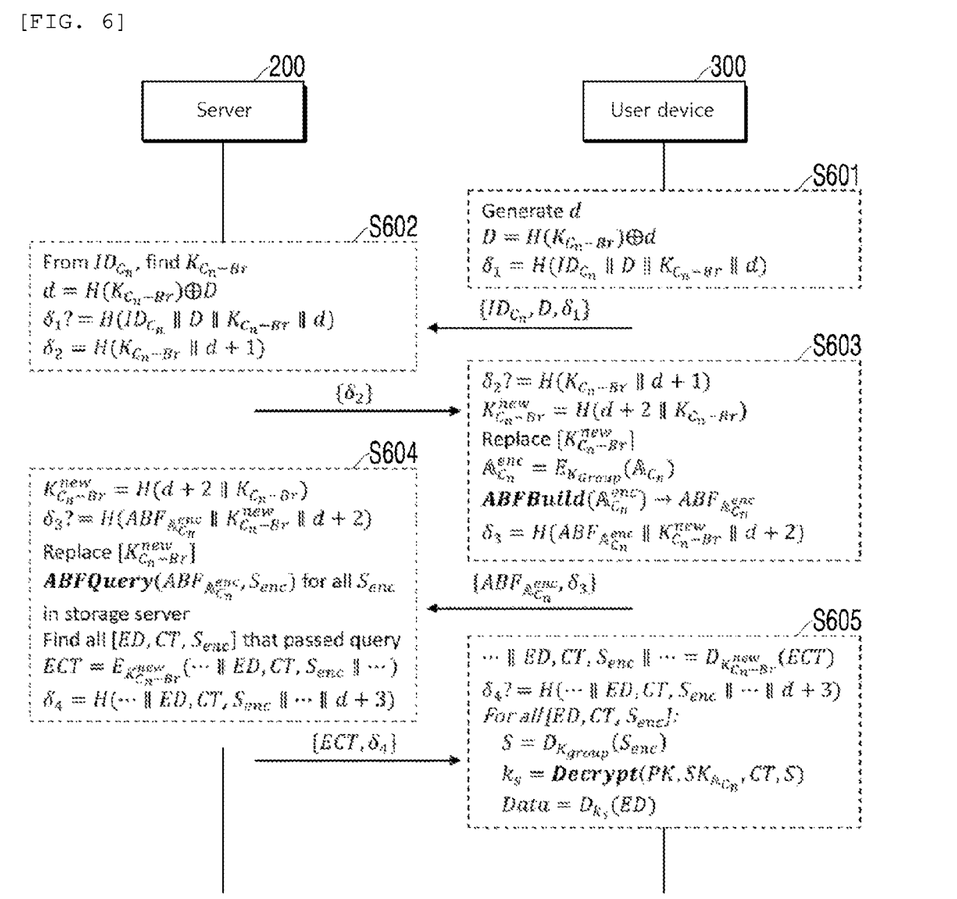
FIG. 6 is a sequence diagram illustrating a data access protocol of a user device according to an embodiment.

In step S406, the user device 300 may perform mutual authentication and data request for the server 200 for IoT data access and may receive IoT data. The user device 300 and the server 200 may authenticate each other prior to IoT data request and transmission. The user device 300 may perform symmetric encryption $$\left(A_{C_n}^{enc} = E_{K_{Group}}(\mathbb{A}_{C_n})\right)$$

on an access policy $A_{C_n}$ included in the private key thereof using the key $K_{Group}$. The key $K_{Group}$ is received from the KMC 500 and is shared with the IoT device 110, and the server 200 does not know the key $K_{Group}$. The user device 300 may generate an attribute bloom filter for the encrypted access policy $A_{C_n}^{enc}$ using an algorithm ABFBuild and transmit the attribute bloom filter to the server 200 to request necessary IoT data. The server 200 may retrieve suitable IoT data by performing $$ABFQuery\left(ABF_{A_{C_n}^{enc}}, S_{enc}\right)$$

on the $S_{enc}$ stored in the cloud server using the received attribute bloom filter as a query. The server 200 may transmit $S_{enc}$ for which TRUE is obtained as a result of ABFQuery to the user device 300. At the time of transmitting $S_{enc}$, the server 200 may transmit $S_{enc}$ along with the symmetric ciphertext ED and the final ciphertext CT with respect to $S_{enc}$ to the user device 300. The user device 300 may decrypt the received $S_{enc}$ with the key $K_{Group}$ to obtain an attribute set S of IoT data. The user device 300 may obtain the symmetric key $k_s$ by using Decrypt(PK, $SK_A$, CT, S) for the private key, the final ciphertext CT, and the attribute set S. The user device 300 may obtain the IoT data by decrypting the symmetric ciphertext ED using the symmetric key $k_s$. This step will be described in detail in FIG. 6.

Figure 5:
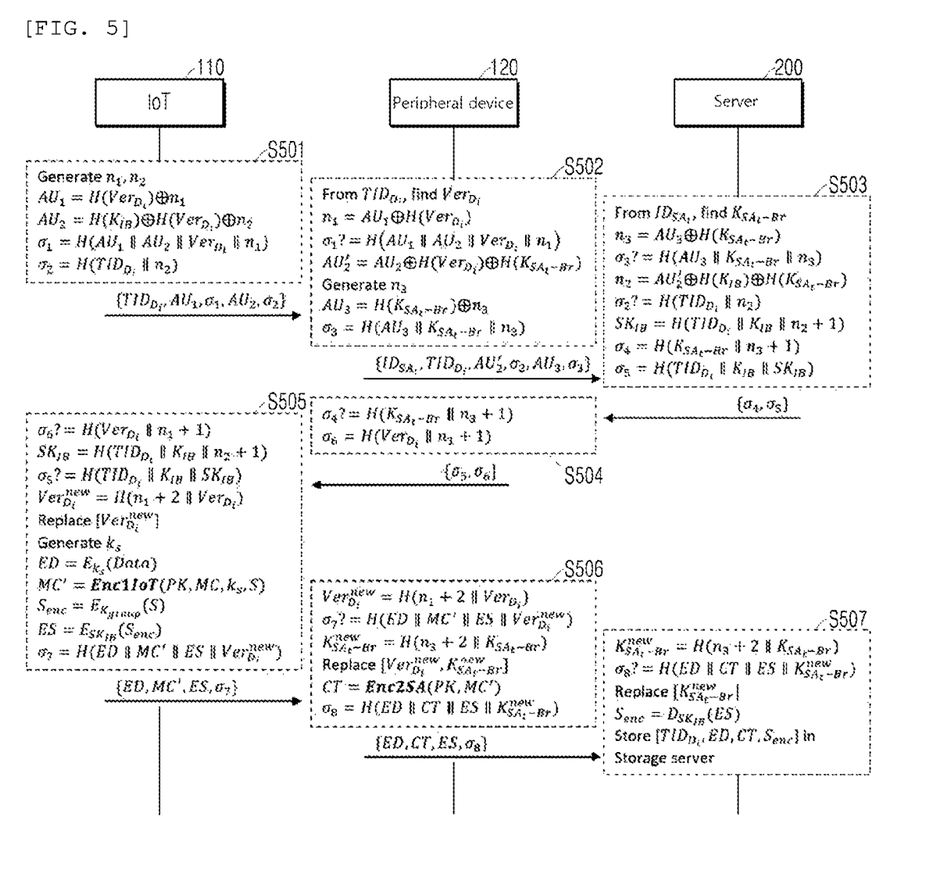
FIG. 5 is a sequence diagram illustrating an IoT data storage protocol according to an embodiment.

FIG. 5 is a sequence diagram illustrating an IoT data storage protocol according to an embodiment. When the IoT device 110 primarily performs some operations of attribute-based encryption on IoT data to generate an intermediate ciphertext and transmits the intermediate ciphertext to the peripheral device 120, the peripheral device 120 may perform the remaining operations of attribute-based encryption on the intermediate ciphertext to generate a final ciphertext and transmit the final ciphertext to the server 200 to store the IoT data. Prior to description of each step of FIG. 5, functions used in the IoT data storage protocol will be described first.

The IoT data storage protocol of an embodiment may outsource a complex operation to the peripheral device (SA) 120 according to encryption outsourced key-policy attribute-based encryption (EO-KP-ABE). An access structure $\mathbb{A}$ is composed of three components such as $\mathbb{A}=(A, \rho, T)$. A is a 1×m matrix, and ρ is a function mapped to each row $A_i$ of A with the attribute name {$att_1$, . . . , $att_n$}. Each $att_k=\rho(i)$ has an attribute value $t_{att_k}$ included in an attribute value set $T=(t_{\rho(1)}, \ldots, t_{\rho(l)}) \in \mathbb{Z}_N^l$. An attribute set S for encrypted data can be defined as, $S=(z_1, \ldots, z_n) \in \mathbb{Z}_N^n$ and each value $z^k$ is an attribute value of $att_k$.

A setup function Setup can be defined as Setup($1^\lambda$). The setup function Setup can generate a bilinear group (e, $p_1$, $p_2$, $p_3$, $\mathbb{G}$, $\mathbb{G}_T$) having $\mathbb{G}=\mathbb{G}_{p_1}\times\mathbb{G}_{p_2}\times\mathbb{G}_{p_3}$ for different primes $p_1$, $p_2$, $p_3$ by executing $\mathcal{G}(1^\lambda)$. $\mathbb{G}$ and $\mathbb{G}_T$ are multiplicative cyclic groups for $N=p_1 p_2 p_3$ and a bilinear map $e: \mathbb{G} \times \mathbb{G} \to \mathbb{G}_T$. In addition, g, $h_0$, $h_1$, . . . , $h_n \in \mathbb{G}_{p_1}$, $X_3 \in \mathbb{G}_{p_3}$, $\alpha \in \mathbb{Z}_N$ is a randomly selected value. The setup function Setup outputs a public key PK={$\mathbb{G}$, $\mathbb{G}_T$, e, N, g, $h_0$, $h_1$, . . . , $h_n$, $e(g,g)^\alpha$} and a master private key MSK={$\alpha$, $X_3$} of the system.

A key generation function can be defined as KeyGen(PK, MSK, $\mathbb{A}=(A, \rho, T)$). KeyGen generates a private key corresponding to the access structure $\mathbb{A}$ of each user device for the user device. Any column vector $\vec{v} \in \mathbb{Z}_N^m$ in which the first row is α may be selected. For each $i \in [1]$, $Q_i$ can represent an attribute set {$att_1$, . . . , $att_n$}\{$\rho(i)$}. For each row $A_i$, $R_i$, $R'_j$, $\{R_{i,j}\}_{j \in Q_i} \in \mathbb{G}_{p_3}$ may be selected by increasing $X_3$ by an arbitrary power, and $r_i \in \mathbb{Z}_N$ may be randomly selected. The key generation function calculates $D_i = g^{A_i \cdot \vec{v}}$ $(h_0 h_{\rho(i)}^{t_{\rho(i)}})^{r_i} R_i$, $D'_i = g^{r_i} R'_j$, $D_{i,j} = h_j^{r_i} R_{i,j}$ and outputs a secret key $SK_A=\{(A, \rho, T), \{D_i, D'_i, \{D_{i,j}\}_{j \in Q_i}\}_{i \in [1]}\}$.

An offline encryption function OfflineEnc can be defined as OfflineEnc(PK). OfflineEnc can select a random number set K={$k_0$, $k_1$, . . . , $k_n$}$\in \mathbb{Z}_N^{n+1}$. OfflineEnc calculates $AC=[e(g,g)^\alpha]^{k_0}$, $AC_0=g^{k_0}$, $H=h_0^{k_0}h_1^{k_1} \ldots h_n^{k_n}$ and outputs MC={AC, $AC_0$, H, K}.

A primary attribute-based encryption function Enc1IoT can be defined as Enc1IoT(PK, MC, $M \in \mathbb{G}_T$, $S=(z_1, \ldots, z_n) \in \mathbb{Z}_N^n$). Enc1IoT partially encrypts a message M for an attribute set S using a previously calculated MC. Enc1IoT selects $s \in \mathbb{Z}_N$, calculates $AC'=M \cdot AC=M \cdot [e(g,g)^\alpha]^{k_0}$, $S^*=(z_1 s - k_1, \ldots, z_n s - k_n)$, $r = s - k_0$, and outputs MC'={AC', $AC_0$, $S^*$, H, r}.

A secondary attribute-based encryption function Enc2SA can be defined as Enc2SA(PK, MC'). Enc2SA calculates $C=AC' \cdot [e(g,g)^\alpha]^r = M \cdot [e(g,g)^\alpha]s$, $C_0 = AC_0 \cdot g^r = g^s$, $C_1 = H \cdot (h_0^{s-k_0} h_1^{z_1 s - k_1} \ldots h_n^{z_n s - k_n})(h_0 \Pi_{i=1}^n h_i^{z_i})^s$ and outputs CT={C, $C_0$, $C_1$}.

A decryption function Decrypt can be defined as Decrypt(PK, $SK_A$, CT, S). Decrypt outputs M if S satisfies an authenticated set $\mathbb{A}$. First, it finds a set $\mathcal{I}=\{i | z_{\rho(i)} = t_{\rho(i)}\} \subseteq [1]$, and calculates $\{\omega_i\}_{i \in \mathcal{I}}$ $\mathbb{A}$ if S satisfies $\mathcal{I}$. $\{\omega_i\}_{i \in \mathcal{I}}$ can be calculated as $\Sigma_{i \in \mathcal{I}} \omega_i A_i = (1, 0, \ldots, 0)$. Decrypt outputs FALSE (−) if it cannot find $\{\omega_i\}_{i \in \mathcal{I}}$. Otherwise, it calculates $$\tilde{D}_i = D_i \prod_{j \in Q_i} D_{i,j}^{z_j} = g^{A_i \cdot \vec{v}} \left(h_0 \sum_{j=1}^n z_j\right)^{r_i} R_i \sum_{j=1}^n R_{i,j}^{z_j}$$

for each $i \in I$. In addition, it calculates $$e\left(C_0, \prod_{i \in I} \tilde{D}_i^{\omega_i}\right) / e\left(C_1 \cdot \prod_{i \in I} D_i'^{\omega_i}\right) = e(g \cdot g)^{\alpha s}$$

and outputs $M=C/e(g,g)^{\alpha s}$. Hereinafter, the IoT device 110 may be referred to as $D_i$, the peripheral device 120 may be referred to as $SA_t$, and the server 200 may be referred to as Br.

In step S501, $D_i$ may select constants $n_1$ and $n_2$, calculate $AU_1=H(Ver_{D_i})\oplus n_1$, $AU_2=H(K_{IB})\oplus H(Ver_{D_i})\oplus n_2$, $\sigma_1$ $H(AU_1\|AU_2\|Ver_{D_i}\|n_1)$ and $\sigma_2=H(TID_{D_i}\|n_2)$, and send $\{TID_{D_i}, AU_1, \sigma_1, AU_2, \sigma_2\}$ to $SA_t$.

In step S502, $SA_t$ may retrieve stored $Ver_{D_i}$ through $TID_{D_i}$ included in the message. $SA_t$ obtains $n_1=AU\oplus H(Ver_{D_i})$ and checks whether $\sigma_1 \stackrel{?}{=} (AU_1\|AU_2\|Ver_{D_i}\|Ver_{D_i}\|n_1)$. If checking passes, $SA_t$ calculates $AU'_2=AU_2\oplus H(Ver_{D_i})\oplus H(K_{SA_t-Br})$. $SA_t$ randomly selects a constant $n_3$, and calculates $AU_3=H(K_{SA_t-Br})\oplus n_3$ and $\sigma_3=H(AU_3\|K_{SA_t-Br}\|n_3)$ $SA_t$ may transmit $(ID_{SA_t}, TID_{D_i}, AU'_2, \sigma_2, AU_3, \sigma_3)$ including some values received from $D_i$ to $B_r$.

In step S503, Br may retrieve $K_{SA_t-Br}$ using $ID_{SA_t}$ and obtain $n_2=AU'_2\oplus H(K_{IB})\oplus H(K_{SA_t-Br})$ and $n_3=AU_3\oplus H(K_{SA_t-Br})$ $B_r$ checks whether $\sigma_2 \stackrel{?}{=} H(TID_{D_i}\|n_2)$ and $\sigma_3 \stackrel{?}{=} H(AU_3\|K_{SA_t-Br}\|n_3)$ If either of two fails, then $B_r$ stops the above step. Otherwise, if both pass, $B_r$ calculates $SK_{IB}=H(TID_{D_i}\|K_{IB}\|n_2+1)$, $\sigma_4=H(K_{SA_t-Br}\|n_3+1)$, and $\sigma_5=H(TID_{D_i}\|K_{IB}\|SK_{IB})$. Then, $B_r$ transmits $(\sigma_4\sigma_5)$ to $SA_t$.

In step S504, $SA_t$ checks whether $\sigma_4 \stackrel{?}{=} H(K_{SA_t-Br}\|n_3+1)$. If checking passes, $SA_t$ calculates $\sigma_6=H(Ver_{D_i}\|n_1+1)$ and transmits $(\sigma_5, \sigma_6)$ to $D_i$.

In step S505, $D_i$ checks whether $a\sigma_6 \stackrel{?}{=} H(Ver_{D_i}\|n_1+1)$, and if it is, calculates $SK_{IB}=H(TID_{D_i}\|K_{IB}\|n_2+1)$. Then, $D_i$ checks whether $\sigma_5 \stackrel{?}{=} H(TID_{D_i}\|K_{IB}\|SK_{IB})$, and if checking passes, calculates $Ver_{D_i}^{new}=H(n_1+2\|Ver_{D_i})$, and replaces stored $Ver_{D_i}$ with $Ver_{D_i}^{new}$. Then, it generates a symmetric key $k_s$ for encrypting Data, which is IoT data that D; intends to share, and calculates $ED=E_{k_s}(Data)$. In addition, $D_i$ generates MC' using Enc1IoT(PK, MC, $k_s$, S). Then, $D_i$ calculates $S_{enc}=E_{K_{Group}}(S)$ and $ES=E_{SK_{IB}}(S_{enc})$. After calculating $\sigma_7=H(ED\|MC'\|ES\|Ver_{D_i}^{new})$, $D_i$ transmits (ED, MC', ES, $\sigma_7$) to $SA_t$.

In step S506, $SA_t$ calculates $Ver_{D_i}^{new}=H(n_1+2\|Ver_{D_i})$ and checks whether $\sigma_7 \stackrel{?}{=} H(ED\|MC'\|ES\|Ver_{D_i}^{new})$. If checking passes, $SA_t$ calculates $K_{SA_tBr}^{new}=H(n_3+2\|K_{SA_t-Br})$, replaces stored $Ver_{D_i}$ with $Ver_{D_i}^{new}$, and replaces stored $K_{SA_t-Br}$ with $K_{SA_t-Br}^{new}$. $SA_t$ calculates $\sigma_8=H(ED\|CT\|ES\|\sigma_8)$ and transmits {ED, CT, ES, $\sigma_8$} to Br.

In step S507, $B_r$ calculates $K_{SA_t-Br}=H(n_3+2\|K_{SA_t-Br})$ and checks whether $\sigma_8=H(ED\|CT\|ES\|K_{SA_t-Br}^{new})$. If checking passes, Br replaces stored $K_{SA_t-Br}$ with $K_{SA_t-Br}$. Then, Br calculates $S_{enc}=D_{SK_{IB}}(ES)$ and stores $[TID_{D_i}, ED, CT, S_{enc}]$ in a storage space of the server.

FIG. 6 is a sequence diagram illustrating a data access protocol of a user device according to an embodiment. The user device 300 may perform mutual authentication first and obtain data satisfying an access policy $A_{C_n}$ from the server 200. Hereinafter, the server 200 may be referred to as $B_r$ and the user device 300 may be referred to as $C_n$. Prior to description of each step of FIG. 6, functions used in the data access protocol will be described. According to the data access protocol of an embodiment, since attributes of data are encrypted with a group key $K_{Group}$ of the protocol, the server 200 serving as a broker cannot ascertain the attributes of the data. The server 200 cannot compare attributes with an access policy of a consumer. In an embodiment, the server 200 may use an attribute bloom filter in order to check a hidden attribute value with relatively little computation. If the user device 300 generates an attribute volume filter (ABF) for the access policy included in the private key thereof through a function ABFBuild and transmits the attribute volume filter to the server 200, the server 200 may find a ciphertext satisfying the access policy by executing a function ABFQuery on the received ABF and encrypted attributes stored in a storage server.

The function ABFBuild can be defined as ABFBuild (PK, $\mathbb{A}=(A, \rho, T)$). The function ABFBuild generates a vacant ABF $\mathbb{A}$ composed of blocks $B_{ABF}$. Here, each block is composed of $\lambda$-bits. The function ABFBuild connects an attribute name $\rho(i)$ corresponding to the i-th row of A and an attribute value $t_{\rho(i)}$ as one element $e_i=i\|\rho(i)\|t_{\rho(i)}$. The function ABFBuild randomly selects $J-1\lambda$-bits string in order to put each element $e_i$ in ABF $\mathbb{A}$, and calculates $r_{i,J}=r_{i,1} \oplus \ldots \oplus r_{i,J-1}\oplus e_i$. The function ABFBuild hashes $\rho(i)\|t_{\rho(i)}$ as $H_1(\rho(i)\|t_{\rho(i)}), \ldots, H_J(\rho(i)\|t_{\rho(i)})$ using J hash functions that output one of the integers from 1 to $B_{ABF}$. The result of each hash function represents the position index of ABF $\mathbb{A}$, and each $r_{i,j}$ enters the position $H_j(\rho(i)\|t_{\rho(i)})$ of ABF $\mathbb{A}$ with $j\in[J]$. If the position $H_j(\rho(i)\|t_{\rho(j)})$ is occupied by a previously added string, it is reused by $r_{i,j}$. The function ABFBuild repeats the above process for all rows of A and outputs ABF $\mathbb{A}$.

The function ABFQuery can be defined as ABFQuery (PK, ABF $\mathbb{A}$, S). The function ABFQuery combines the corresponding attribute name $att_k$ for each attribute value $z_k\in S$, and hashes it as $H_1(att_k\|z_k), \ldots, H_J(att_k\|z_k)$ with a hash function J. For each $j\in[J]$, the function ABFQuery can obtain a string $st_{k,j}$ at the position $H_j(att_k\|z_k)$ of $ABF_A$. The function ABFQuery reconstructs the element $e^*_k$ as $e^*_k= st_{k,1}\oplus st_{k,2}\oplus \ldots \oplus st_{k,J}$ with this string. The function ABFQuery takes the last $L_{attn}+L_{attv}$-bit string from the element $e^*_k$, and checks whether it is identical to $att_k\|z_k$. If they are identical, it can be interpreted that the attribute name $att_k$ and the attribute value $z_k$ are included in the access structure $\mathbb{A}$. The function ABFQuery obtains leading $L_{rn}$ bits of $e^*_k$, which represent the row of the matrix corresponding to the attribute name $att_k$ and attribute value $z_k$. After repeating the above process for all $z_k$, the function ABFQuery creates a set $I=(i:t_{\rho(i)}\in S)$ with the obtained row number. If S satisfies A, the function ABFQuery can find $\omega_i$ satisfying $\Sigma_{i\in I}\omega_i A_i=(1, 0, \ldots, 0)$ using the row $\Sigma_{i\in I}\omega_i A_i fA$ corresponding to the obtained row number. In this case, the function ABFQuery outputs 1, which means TRUE, and in the opposite case, that is, if S does not satisfy A, outputs 0.

In step S601, $C_n$ randomly selects a constant d and calculates $D=H(K_{C_n-Br})\oplus d$ and $\delta_1=H(ID_{C_n}\|D\|K_{C_n-Br}\|d)$. $C_n$ transmits $\{ID_{C_n}, D, \delta_1\}$ to Br.

In step S602, $B_r$ may retrieve $K_{C_n-Br}$ using $ID_{C_n}$ and obtain $d=H(K_{C_n-Br})\oplus D$. Br checks whether $\delta_1 \stackrel{?}{=} H(ID_{C_n}\|D\|K_{C_n-Br}\|d)$ and if checking fails, the above step is stopped. Otherwise, Br calculates $\delta_2=H(K_{C_n-Br})$ and transmits $\{\delta_2\}$ to $C_n$.

In step S603, $C_n$ checks whether $\delta_2 \stackrel{?}{=} H(K_{C_n-Br}\|d+1)$. After checking, $C_n$ calculates $K_{C_n-Br}^{new}=H(d+2\|K_{C_n-Br})$ and replaces $K_{C_n-Br}$ with $K_{C_n-Br}^{new}$. Then, $C_n$ calculates $$\mathbb{A}_{C_n}^{enc} = E_{K_{Group}}(\mathbb{A}_{C_n}), ABF_{\mathbb{A}_{C_n}^{enc}} = ABFBuild(\mathbb{A}_{C_n}^{enc}), \text{ and}$$

$$\delta_3 = H\left(ABF_{A_{C_n}^{enc}} \| K_{C_n-Br}^{new} \| d+2\right)$$

and transmits $$\{ABF_{A_{C_n}^{enc}}, \delta_3\}$$

to $B_r$.

In step S604, $B_r$ calculates $K_{C_n-Br}^{new}=H(d+2\|K_{C_n-Br})$ and verifies whether $$\delta_3 \stackrel{?}{=} H\left(ABF_{A_{C_n}^{enc}} \| K_{C_n-Br}^{new} \| d+2\right).$$

Br calculates $K_{C_n-Br}^{new}=H(d+2\|K_{C_n-Br})$ and replaces $K_{C_n-Br}$ with $K_{C_n-Br}^{new}$. To find data including S satisfying $\mathbb{A}_{C_n}$, $B_r$ executes a function $$ABFQuery(ABF_{A_{C_n}^{enc}}, S_{enc})$$

on all $S_{enc}$ of the storage server. Br retrieves for all [ED, CT, S_(enc)] for which a query result value is TRUE and calculates $$ECT = E_{K_{C_n-Br}^{new}}(\cdots \| ED, CT, S_{enc} \| \cdots)$$

in order to encrypt all retrieval results. Br calculates $\delta_4$=H ( ... $\|$ED, CT, $S_{enc}\|$ ... $\|$d+3) and transmits {ECT, $\delta_4$} to $C_n$.

In step S605, $C_n$ may obtain a ciphertext and a hidden attribute sets by performing step $$D_{K_{C_n-Br}^{new}} = \cdots \| ED, CT, S_{enc} \| \cdots.$$

$C_n$ verifies whether $\delta_4 \stackrel{?}{=}$H( ... $\|$ED, CT, $S_{enc}\|$ ... $\|$d+3) and calculates S=$D_{K_{Group}}(S_{enc})$, $k_s$=Decrypt (PK, $SK_{\mathbb{A}_{C_n}}$, CT, S), and Data=$D_{k_s}$(ED) for all [ED, CT, $S_{enc}$].

Figure 7:
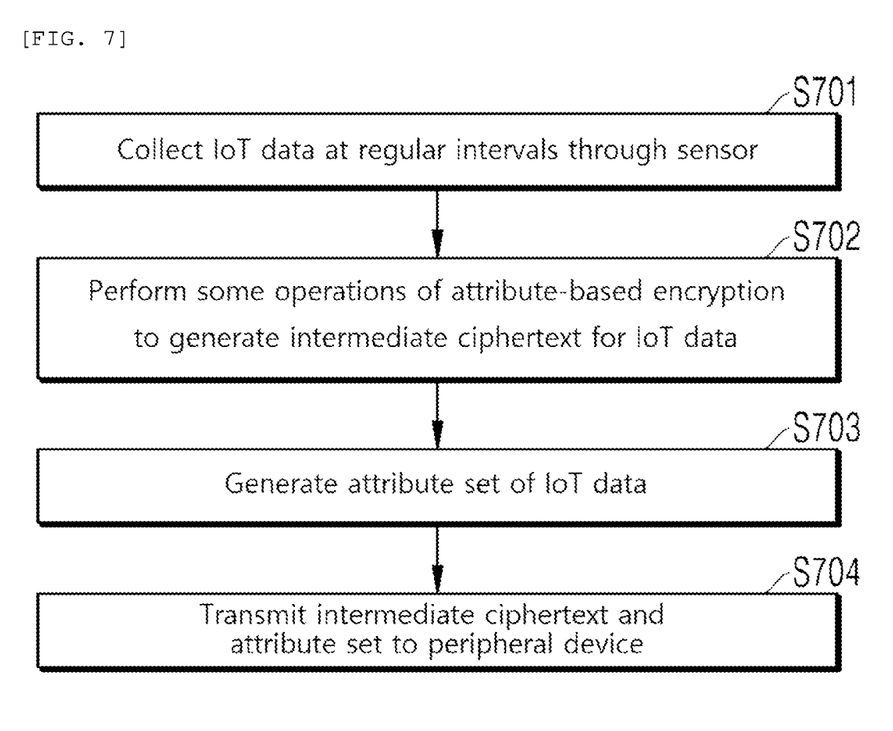
FIG. 7 is a flowchart of a method in which an IoT device shares IoT data according to an embodiment.

FIG. 7 is a flowchart of a method in which an IoT device shares IoT data according to an embodiment.

In step S701, the IoT device 110 may collect IoT data at regular intervals through at least one sensor included in the IoT device 110.

In step S702, the IoT device 110 may generate an intermediate ciphertext obtained by partially encrypting the collected IoT data by performing some operations of attribute-based encryption. Some operations of attribute-based encryption may include multiplication and subtraction operations, and may not include exponential operation and bilinear pairing operation.

In step S703, the IoT device 110 may generate an attribute set for the IoT data. The IoT device 110 may encrypt the attribute set using a group key. The group key may be shared in advance with the user device 300 requiring IoT data by the key management center 500.

In step S704, the IoT device 110 may transmit the intermediate ciphertext and the encrypted attribute set together to the peripheral device 120 in order to request execution of the remaining operations of attribute-based encryption. The peripheral device 120 may provide external network communication connection for the IoT device 110 and may perform higher-performance operation than the IoT device 110. The remaining operations of attribute-based encryption requested for the peripheral device 120 may include exponential operation and bilinear pairing operation.

Figure 8:
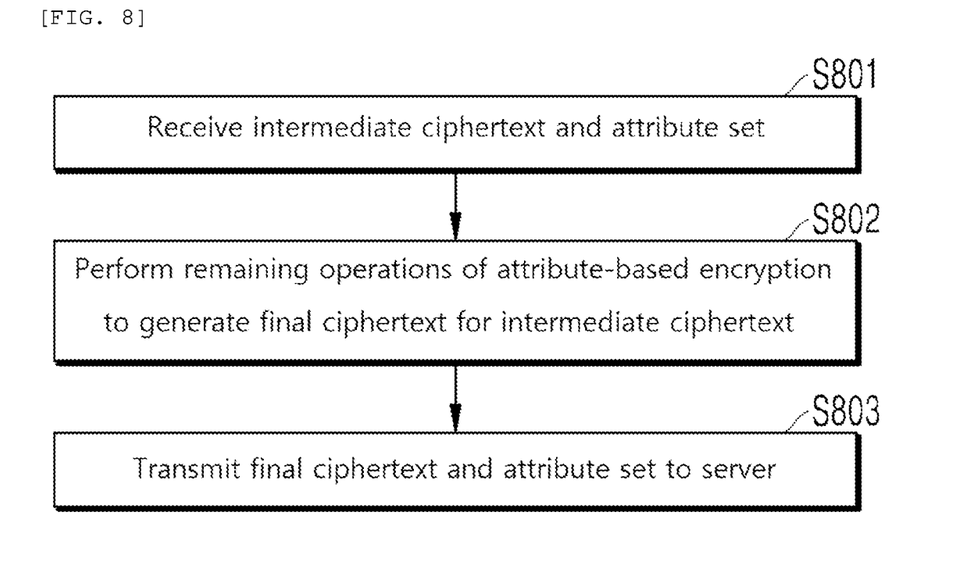
FIG. 8 is a flowchart of a method in which a peripheral device shares IoT data according to an embodiment.

FIG. 8 is a flowchart of a method in which a peripheral device shares IoT data according to an embodiment.

In step S801, the peripheral device 120 may receive an intermediate ciphertext and an encrypted attribute set from the IoT device 110.

In step S802, the peripheral device 120 may generate a final ciphertext for the intermediate ciphertext by performing the remaining operations of attribute-based encryption. The remaining operations of attribute-based encryption may include exponential operation and bilinear pairing operation.

In step S803, the peripheral device 120 may transmit the final ciphertext and the encrypted attribute set to the server.

Figure 9:
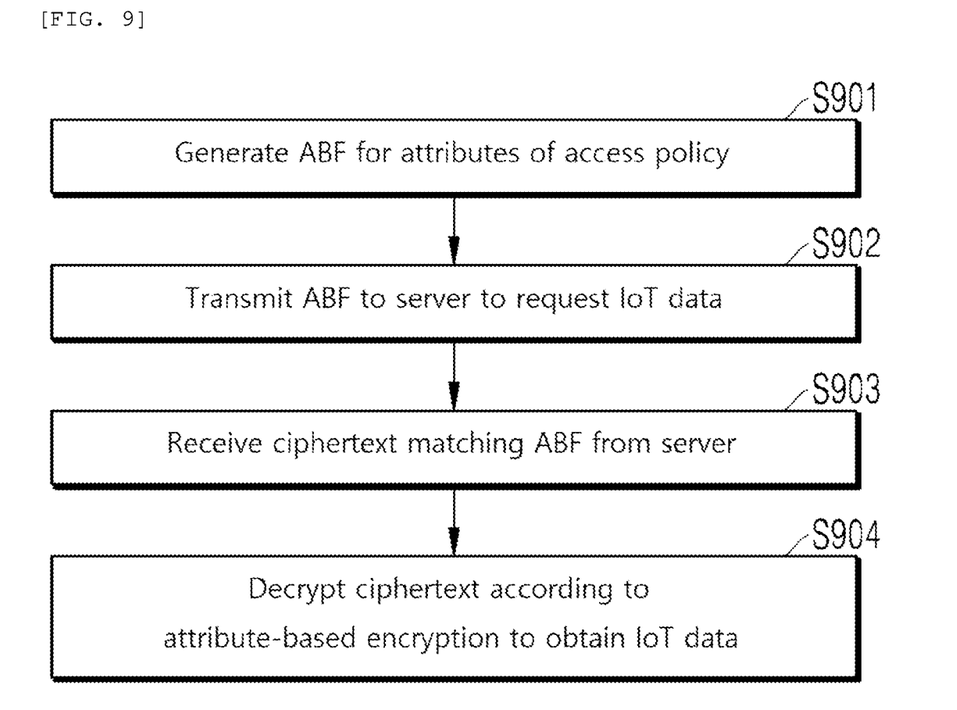
FIG. 9 is a flowchart of a method in which a user device shares IoT data according to an embodiment.

FIG. 9 is a flowchart of a method in which a user device shares IoT data according to an embodiment.

In step S901, the user device 300 may generate an ABF for attributes of an access policy. The user device 300 may encrypt attributes constituting an access policy included in a private key using a group key and generate an attribute bloom filter using the encrypted access policy. The group key may be shared in advance with the IoT device 110 that has generated IoT data by the key management center 500.

In step S902, the user device 300 may transmit the ABF to the server 200 to request IoT data.

In step S903, the user device 300 may receive a ciphertext matching the ABF from the server 200. The ciphertext matching the ABF is a ciphertext of an attribute set retrieved using the ABF as a query.

In step S904, the user device 300 may decrypt the received ciphertext according to attribute-based encryption to obtain IoT data.

The embodiments described above may be implemented as hardware components, software components, and/or a combination of hardware components and software components. For example, the devices, methods and components described in the embodiments may be implemented using one or more general purpose or special purpose computers such as a processor, a controller, an arithmetic logic unit (ALU), a digital signal processor, a microcomputer, a field programmable gate array (FPGA), a programmable logic unit (PLU), microprocessors, or any other devices capable of executing and responding to instructions, for example. A processing device may execute an operating system (OS) and one or more software applications running on the operating system. Further, the processing device may access, store, operate, process, and generate data in response to execution of software. For convenience of understanding, there are cases in which one processing device is used, but those skilled in the art will understand that the processing device may include a plurality of processing elements and/or a plurality of types of processing elements. For example, the processing device may include a plurality of processors or a processor and a controller. Other processing configurations such as a parallel processor are possible.

Software may include a computer program, code, instructions, or a combination of one or more thereof, and may configure a processing device such that it operates as desired or issue commands to the processing device independently or collectively. To be interpreted by a processing device or to provide instructions or data to the processing device, software and/or data may be permanently or temporarily embodied in any type of machine, component, physical device, virtual equipment, computer storage medium or device, or transmitted signal waves. Software may be distributed to computer systems connected via a network and stored or executed in a distributed manner. Software and data may be stored in one or more computer-readable recording media.

The method according to the embodiments may be implemented in the form of program instructions that can be executed through various computer means and recorded on a computer-readable medium. The computer-readable medium may include program instructions, data files, data structures, etc. alone or in combination. Program commands recorded on the medium may be specially designed and configured for the embodiments or may be known to and usable by those skilled in computer software. Examples of computer-readable recording media include magnetic media such as hard disks, floppy disks and magnetic tapes, optical media such as CD-ROMs and DVDs, magneto-optical media such as floptical disks, and hardware devices specially configured to store and execute program instructions, such as a ROM, a RAM, and flash memory. Examples of program instructions include high-level language code that can be executed by a computer using an interpreter as well as machine language code such as code created by a compiler. The hardware devices described above may be configured to operate as one or more software modules to perform the operations of the embodiments, and vice versa.

Although the embodiments have been described with limited examples and drawings, as described above, those skilled in the art can make various modifications and variations from the above description. For example, even if the described techniques are performed in an order different from the method described, and/or components such as the described system, structures, devices, and circuits are combined in a different form from the method described above or replaced by other components or equivalents, appropriate results can be achieved. Therefore, other implementations, other embodiments, and equivalents of the claims are within the scope of the following claims.

What is claimed is:

1. An IoT device including at least one sensor, configured to:
   collect IoT data at regular intervals through the at least one sensor;
   generate a partially encrypted intermediate ciphertext by performing at least some operations of attribute-based encryption on the IoT data; and
   transmit the intermediate ciphertext to a peripheral device in order to request remaining operations of attribute-based encryption for the intermediate ciphertext,
   wherein the IoT device generates an attribute set for the IoT data, encrypts the attribute set using a group key, and transmits the encrypted attribute set to the peripheral device; and
   wherein the group key is shared in advance with a user device requesting the IoT data.

2. The IoT device according to claim 1, wherein the peripheral device provides external network communication connection to the IoT device and has higher computing performance than computing performance of the IoT device.

3. The IoT device according to claim 1, wherein the at least some operations of attribute-based encryption include a multiplication operation and a subtraction operation, and the remaining operations of attribute-based encryption include an exponential operation and a bilinear pairing operation.

4. The IoT device according to claim 1, wherein the peripheral device is identified according to a position of the IoT device on the basis of a handover method in response to movement of the IoT device, and the intermediate ciphertext is transmitted after the IoT device and the peripheral device perform mutual authentication.

5. The IoT device according to claim 1, wherein the IoT device classifies a plurality of operations of the attribute-based encryption the some operations and the remaining operations based on an amount of computation.

6. The IoT device according to claim 5, wherein the amount of computation in the remaining operations is larger than the amount of computation in the some operations.

7. An electronic device including a communication interface, configured to:
   provide external network communication connection to an IoT device using the communication interface;
   receive a partially encrypted intermediate ciphertext and an encryption request for the intermediate ciphertext from the IoT device, the intermediate ciphertext being generated by performing some operations of attribute-based encryption on IoT data;
   generate a ciphertext by performing remaining operations of the attribute-based encryption on the intermediate ciphertext in response to the encryption request; and
   transmit the ciphertext to a server.

8. The electronic device according to claim 7, wherein the electronic device receives an encrypted attribute set for the data from the IoT device and transmits the attribute set along with the ciphertext to the server.

9. The electronic device according to claim 8, wherein the ciphertext is identified by using an attribute bloom filter created to request IoT data as a query.

10. The electronic device according to claim 7, wherein the some operations of attribute-based encryption according to the encryption request include an exponential operation and a bilinear pairing operation.

11. The electronic device according to claim 7, wherein a plurality of operations of the attribute-based encryption are classified into the some operations and the remaining operations based on an amount of computation.

12. The electronic device according to claim 11, wherein the amount of computation in the remaining operations is larger than the amount of computation in the some operations.

13. An electronic device comprising:
   one or more processors coupled to memory configured to:
   encrypt attributes constituting an access policy with a group key and create an attribute bloom filter using the encrypted access policy;
   transmit the attribute bloom filter to a server to request IoT data;
   receive a ciphertext retrieved by using the attribute bloom filter as a query and an attribute set for the ciphertext from the server; and
   obtain the IoT data by decrypting the ciphertext using the group key and a private key,
   wherein the group key is shared in advance with an IoT device that generates the attribute set for the IoT data, encrypts the attribute set for the IoT data using the group key, and transmits the encrypted attribute set to a peripheral device.

14. The electronic device according to claim 13, wherein the electronic device decrypts the attribute set using the group key and decrypts the ciphertext on the basis of attribute-based encryption using the private key.

15. The electronic device according to claim 14, wherein the attribute set corresponds to attributes constituting the access policy.

* * * * *